United States Patent
Shimokawa

(10) Patent No.: US 10,201,925 B2
(45) Date of Patent: Feb. 12, 2019

(54) EXTRUSION APPARATUS

(71) Applicant: Toyota Jidosha Kabushiki Kaisha, Toyota-shi, Aichi-ken (JP)

(72) Inventor: Takuya Shimokawa, Nagakute (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 256 days.

(21) Appl. No.: 15/238,162

(22) Filed: Aug. 16, 2016

(65) Prior Publication Data

US 2017/0057150 A1    Mar. 2, 2017

(30) Foreign Application Priority Data

Aug. 24, 2015 (JP) ................... 2015-165254

(51) Int. Cl.
| | | |
|---|---|---|
| B29C 47/22 | (2006.01) | |
| B29C 47/00 | (2006.01) | |
| B29C 47/08 | (2006.01) | |

(52) U.S. Cl.
CPC ...... B29C 47/0066 (2013.01); B29C 47/0021 (2013.01); B29C 47/0026 (2013.01); B29C 47/085 (2013.01); B29C 47/22 (2013.01); B29C 47/0054 (2013.01); B29C 47/0828 (2013.01)

(58) Field of Classification Search
CPC ............ B29C 47/0021; B29C 47/0026; B29C 47/0054; B29C 47/0066; B29C 47/0828; B29C 47/085; B29C 47/22
See application file for complete search history.

(56) References Cited

U.S. PATENT DOCUMENTS

| | | | |
|---|---|---|---|
| 4,432,718 A | | 2/1984 | Wurzer |
| 5,110,519 A | * | 5/1992 | Daubenbuchel .... B29C 47/0023 264/40.5 |
| 6,773,249 B1 | * | 8/2004 | Przytulla ............. B29C 47/0023 425/141 |
| 2006/0099290 A1 | | 5/2006 | Rohde et al. |
| 2010/0044927 A1 | | 2/2010 | Criel et al. |
| 2012/0306117 A1 | | 12/2012 | Criel et al. |
| 2014/0113016 A1 | | 4/2014 | Ito et al. |

FOREIGN PATENT DOCUMENTS

| | | |
|---|---|---|
| JP | 04-15446 Y2 | 4/1992 |
| JP | H07144355 A | 6/1995 |
| JP | 4295213 B2 | 7/2009 |
| JP | 2010-505649 A | 2/2010 |
| JP | 2012240362 A | 12/2012 |
| JP | 5427834 B2 | 2/2014 |
| JP | 2017-007301 A | 1/2017 |
| WO | 2012160836 A1 | 11/2012 |

* cited by examiner

*Primary Examiner* — Robert J Grun
*Assistant Examiner* — Joseph S Leyson
(74) *Attorney, Agent, or Firm* — Dinsmore & Shohl LLP

(57) ABSTRACT

An extrusion apparatus is provided with a cylindrical die, a core that is placed inside the die, that is able to move relatively to the die in an axial direction of the die, and that forms a flow path for molten resin between the core and the die, a recessed portion that is provided partway along the flow path and that is recessed in the axial direction, and a separator that is inserted into the recessed portion in the axial direction, an insertion position of the separator in the axial direction changing in conjunction with the movement of the core relative to the die, and that cuts the molten resin by means of a portion thereof that extends from the recessed portion into the flow path.

5 Claims, 9 Drawing Sheets

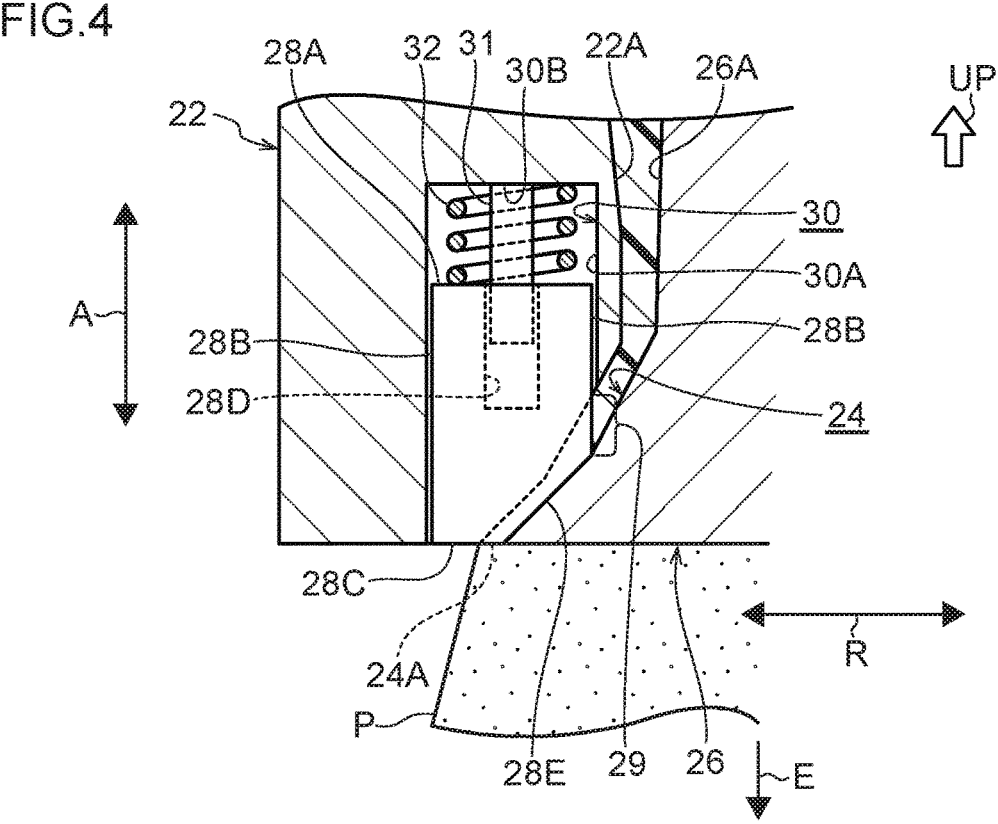
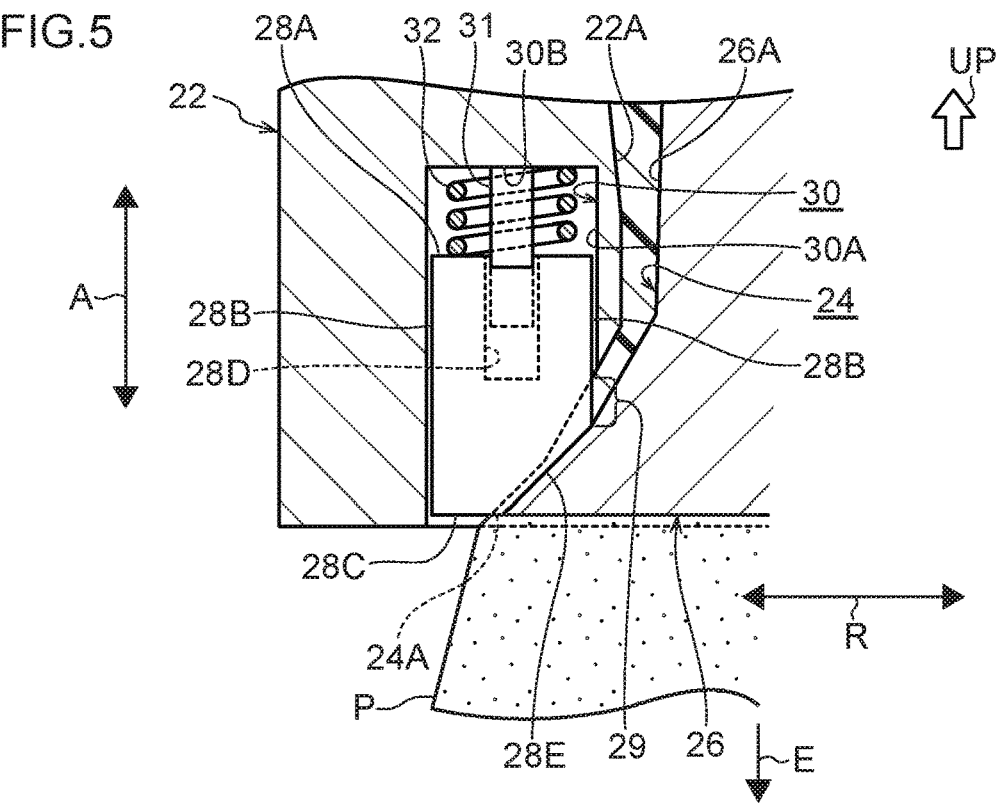

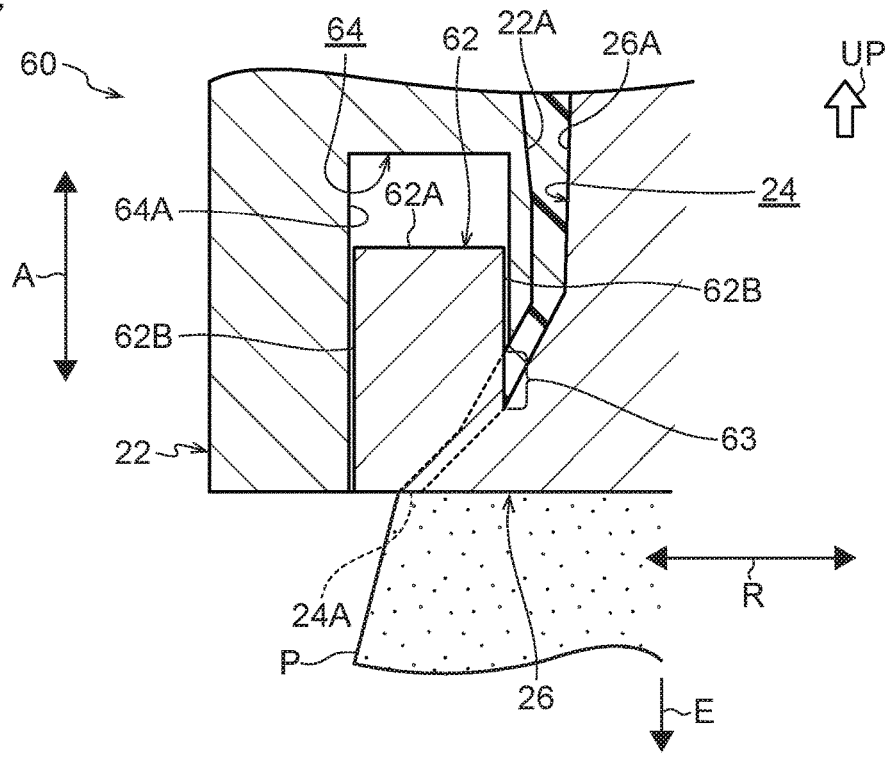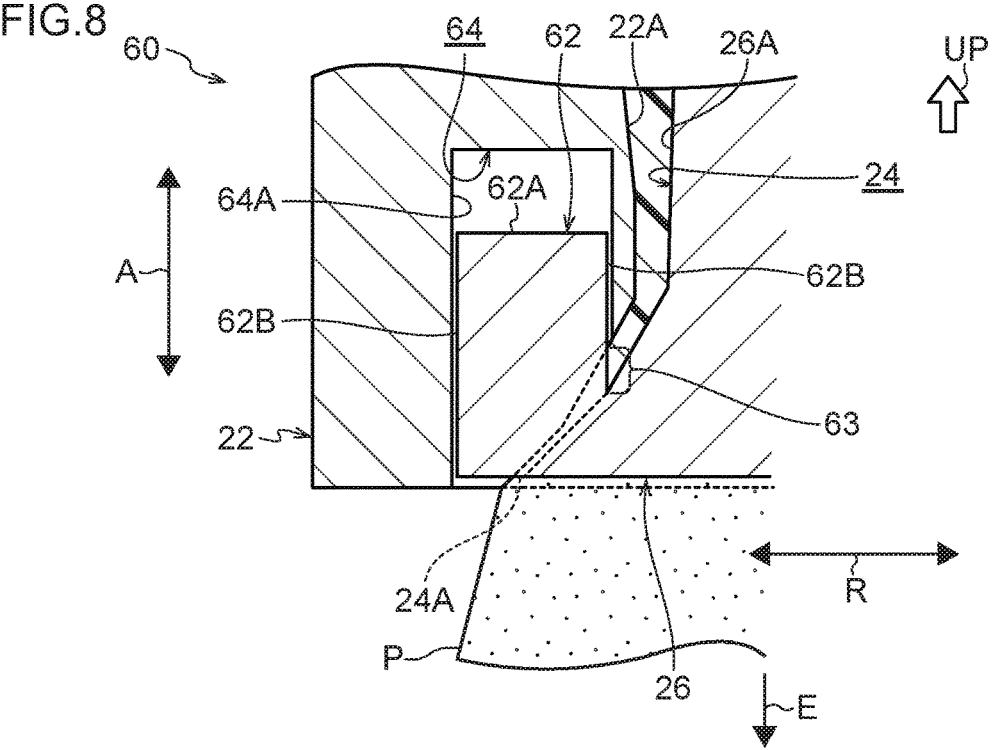

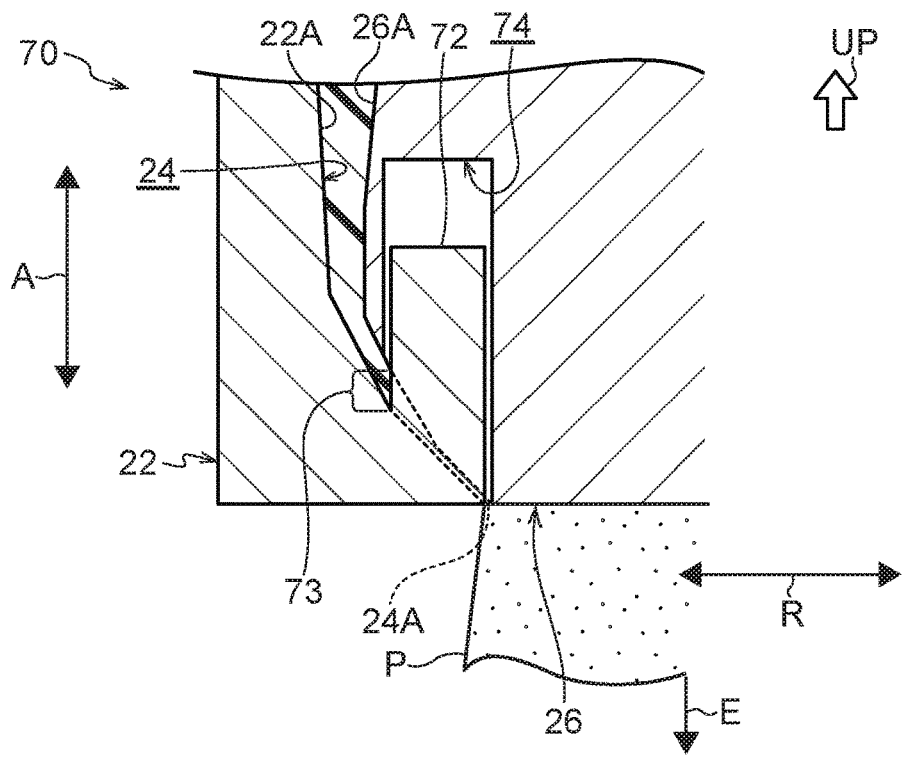
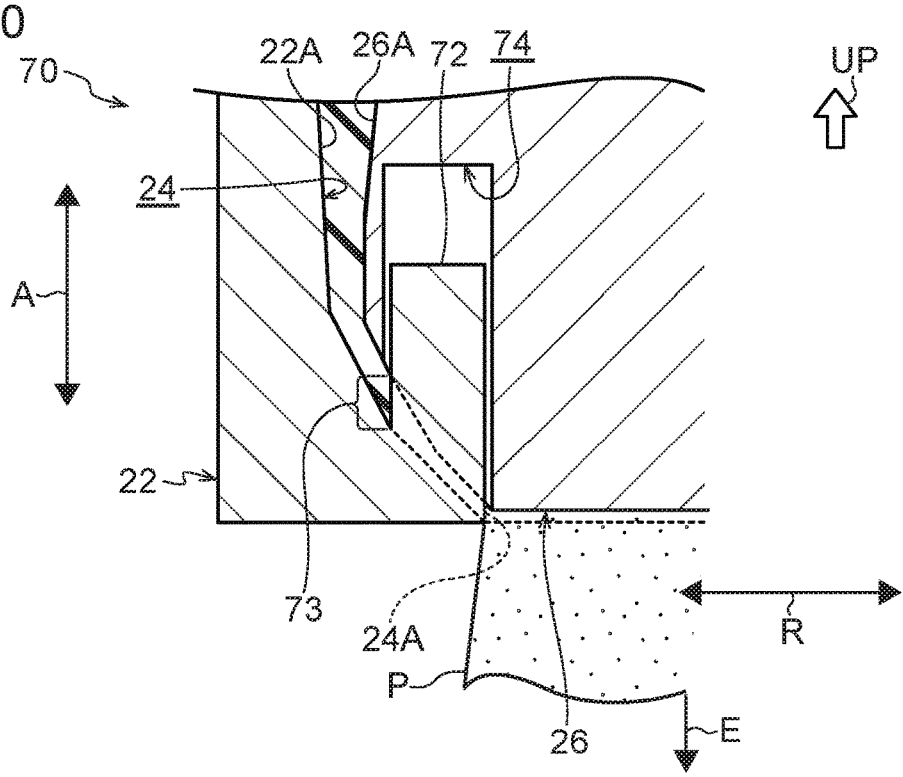

EXTRUSION APPARATUS

CROSS-REFERENCE TO RELATED APPLICATION

This application is based on and claims priority under 35 USC 119 from Japanese Patent Application No. 2015-165254 filed on Aug. 24, 2015, the disclosure of which is incorporated by reference herein.

BACKGROUND

Technical Field

The present disclosure relates to a resin extrusion apparatus.

Related Art

An extrusion apparatus is disclosed in Japanese Patent No. 5427834 in which a separator is pushed from an external surface of a core towards an internal surface of a die, and molten resin that moves along a flow path that is formed between the core and the die is cut so that sheet-shaped resin is extruded from the flow path discharge aperture.

However, in the extrusion apparatus disclosed in Japanese Patent No. 5427834, the separator is urged in a direction that orthogonally intersects the direction of movement of the core so that an end portion of the separator abuts against the outer surface of the core. Because of this, if the core is moved in order to adjust the thickness of the molten resin, the end portion of the separator slides over the outer surface of the core, and there is a possibility of a gap being created between the end portion of the separator and the outer surface of the core. If a gap is created in this way, then it becomes easy for the molten resin to leak out through this gap, and for defects to occur when the molten resin is cut by the separator.

SUMMARY

An object of aspects of the present disclosure is to provide an extrusion apparatus that makes it possible to suppress defects in the cutting of molten resin by a separator.

An extrusion apparatus according to a first aspect of the present disclosure is provided with a cylindrical die, a core that is placed inside the die, that is able to move relatively to the die in an axial direction of the die, and that forms a flow path for molten resin between the core and the die, a recessed portion that is provided partway along the flow path and that is recessed in the axial direction; and a separator that is inserted into the recessed portion in the axial direction, an insertion position of the separator in the axial direction changing in conjunction with the movement of the core relative to the die, and that cuts the molten resin by means of a portion thereof that extends from the recessed portion into the flow path.

In the extrusion apparatus according to the first aspect, because molten resin moving along a flow path is cut by a portion of a separator that protrudes from a recessed portion onto the flow path, sheet-shaped resin can be extruded from a discharge aperture of the flow path.

In the above-described extrusion apparatus, the separator is inserted in the axial direction of a die (hereinafter, this is referred to where appropriate as a 'die axial direction') into a recessed portion, and the insertion position of the separator inside the recessed portion in the die axial direction changes in conjunction with the relative movement of the core in relation to the die. Namely, in the above-described extrusion apparatus, even if the core moves relatively to the die, the only change is the insertion position of the separator in the die axial direction inside the recessed portion, and there is no sliding motion between the separator and either the internal surface of the die or the external surface of the core. Because of this, compared, for example, with a structure in which the separator does slide against the internal surface of the die or the external surface of the core, it is difficult for a gap to be created between the separator and the internal surface of the die or the external surface of the core, and it is possible to suppress any resin leakages. As a consequence, it is possible to minimize defects when molten resin is being cut by a separator.

An extrusion apparatus according to a second aspect of the present disclosure is characterized in that, in the extrusion apparatus according to the first aspect, the recessed portion is recessed toward an opposite side from a direction in which the molten resin is extruded.

In the extrusion apparatus according to the second aspect, because the recessed portion is recessed toward the opposite side from the direction in which the molten resin is extruded, compared, for example, with a structure in which the recessed portion is recessed toward the same side as the side on which the molten resin is extruded, it is possible to effectively prevent the molten resin moving along the flow path from entering into the gap between the recessed portion and the separator.

An extrusion apparatus according to a third aspect of the present disclosure is characterized in that, in the extrusion apparatus according to the first aspect, the recessed portion is provided at one of the die or the core, and internally houses a pressing component, the separator is provided independently of the die and the core, and the pressing component urges the separator towards an opposite side from the direction in which the separator is inserted into the recessed portion so as to press the separator against the other one of the die or the core.

In the extrusion apparatus according to the third aspect, the separator, which is provided independently of the die and the core, is urged by the pressing component that is housed in the recessed portion provided at one of the die or the core in the opposite direction from the direction in which it is inserted into the recessed portion so as to be pushed against the other one of the die or the core. Because of this, even if the core does move relatively to the die, it is difficult for a gap to be created between the separator and the other one of the die or the core, and resin leakages can be further suppressed.

An extrusion apparatus according to a fourth aspect of the present disclosure is characterized in that, in the extrusion apparatus according to the third aspect, a plurality of the recessed portions and a plurality of the separators are provided at one of the die or the core, and the pressing component is able to retract the entire separator into the inside of the recessed portion.

In the extrusion apparatus according to the fourth aspect, a plurality of the recessed portions and the plurality of the separators are provided at one of the die or the core, and the pressing component is able to retract an entire separator into the inside of the recessed portion. Because of this, by using the pressing component to either retract any one separator from among the plurality of separators entirely inside the recessed portion, or to press against the other one of the die and the core without all of the separators having been retracted inside the recessed portion, it is possible to form a desired number of sheet-shaped resin sheets.

An extrusion apparatus according to a fifth aspect of the present disclosure is characterized in that, in the extrusion apparatus according to the first aspect, the recessed portion is provided at one of the die or the core, and the separator is provided integrally with the other one of the die or the core, and protrudes towards whichever one of the die or the core the recessed portion is formed in.

In the extrusion apparatus according to the fifth aspect, the recessed portion is provided at one of the die or the core, and the separator, which protrudes towards whichever one of the die or the core the recessed portion is formed in, is provided integrally with the other one of the die or the core. By providing the separator integrally with the other one of the die and the core, the apparatus manufacturing costs can be reduced.

According to aspects of the present disclosure, it is possible to provide an extrusion apparatus that suppresses defects when molten resin is being cut by a separator.

BRIEF DESCRIPTION OF THE DRAWINGS

Exemplary embodiments of the present disclosure will be described in detail based on the following figures, wherein:

FIG. 4 is an enlarged cross-sectional view of a portion indicated by an arrow 4 in FIG. 3.

FIG. 5 is an enlarged cross-sectional view showing a state in which a core has been moved upwards from a position shown in FIG. 4.

FIG. 7 is an enlarged cross-sectional view (i.e., an enlarged cross-sectional view corresponding to FIG. 4) showing principal portions of an extrusion apparatus according to a second embodiment of the present disclosure.

FIG. 8 is an enlarged cross-sectional view showing a state in which a core has been moved upwards from a position shown in FIG. 7.

FIG. 9 is an enlarged cross-sectional view (i.e., an enlarged cross-sectional view corresponding to FIG. 4) showing principal portions of a variant example of the extrusion apparatus according to the second embodiment of the present disclosure.

FIG. 10 is an enlarged cross-sectional view showing a state in which a core has been moved upwards from a position shown in FIG. 9.

DETAILED DESCRIPTION

Hereinafter, embodiments of an extrusion apparatus according to the present disclosure will be described.

First Embodiment

Figure 1:
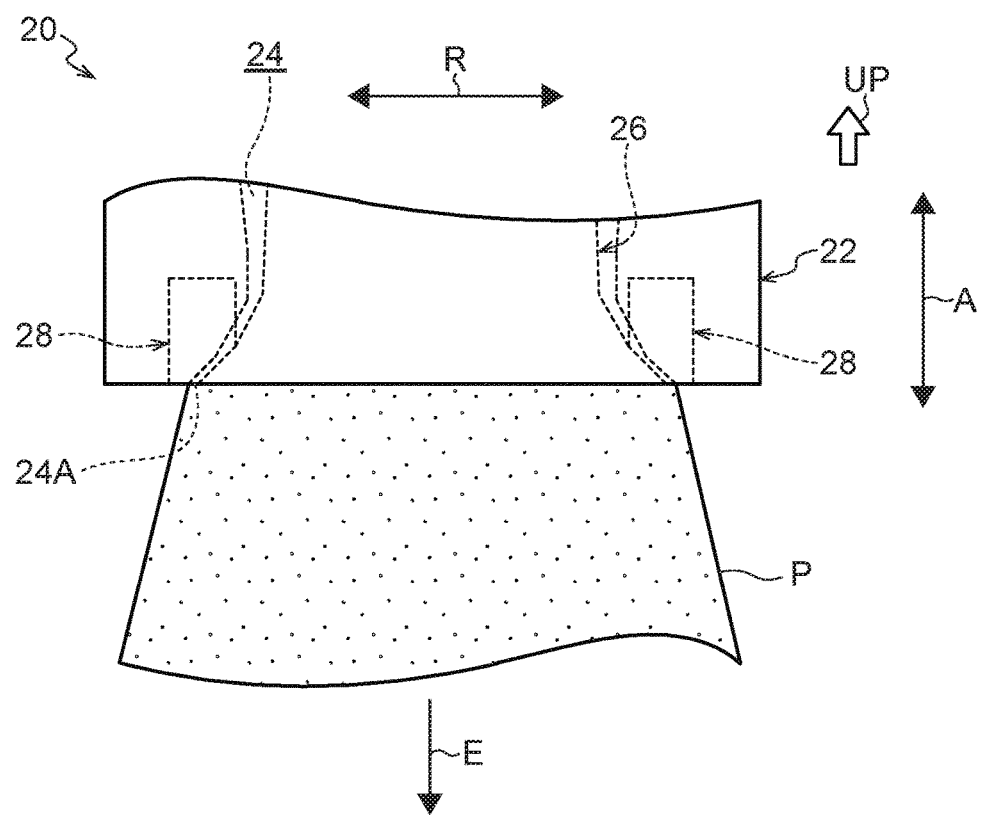
FIG. 1 is a side view showing an extrusion apparatus according to a first embodiment of the present disclosure as seen from one side.
Figure 6:
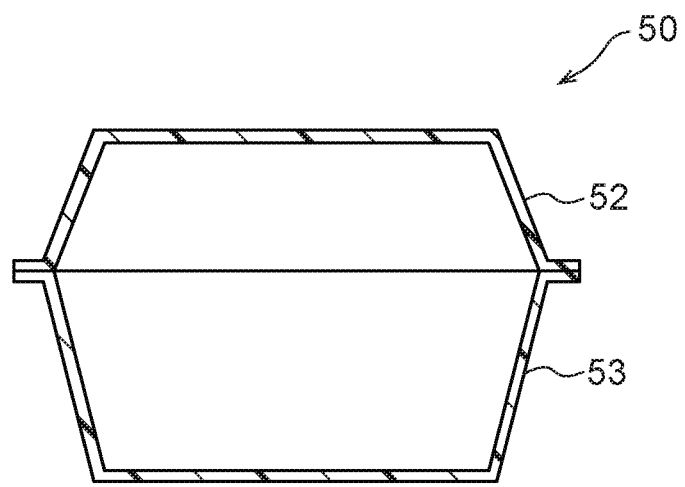
FIG. 6 is a cross-sectional view of a fuel tank that is formed using the sheet-shaped resin that was extruded in FIG. 1.

As is shown in FIG. 1, an extrusion apparatus 20 according to a first embodiment of the present disclosure is an apparatus that extrudes resin P in a molten state (hereinafter, this will be referred to where appropriate as 'molten resin'), so as to mold sheet-shaped resin (hereinafter, this will be referred to where appropriate as a 'resin sheet'). This resin sheet can be used, for example, as a material to form a fuel tank 50 for a vehicle, which is shown in FIG. 6. Specifically, the resin sheet can be used as a material to form a tank main body 52 and a tank main body 53 that make up the fuel tank 50.

Note that the present disclosure is not limited to the above-described structure and it is also possible to use the resin sheet to form another resin molded component for a vehicle, or to form another resin molded component for use in applications other than in a vehicle.

Figure 2:
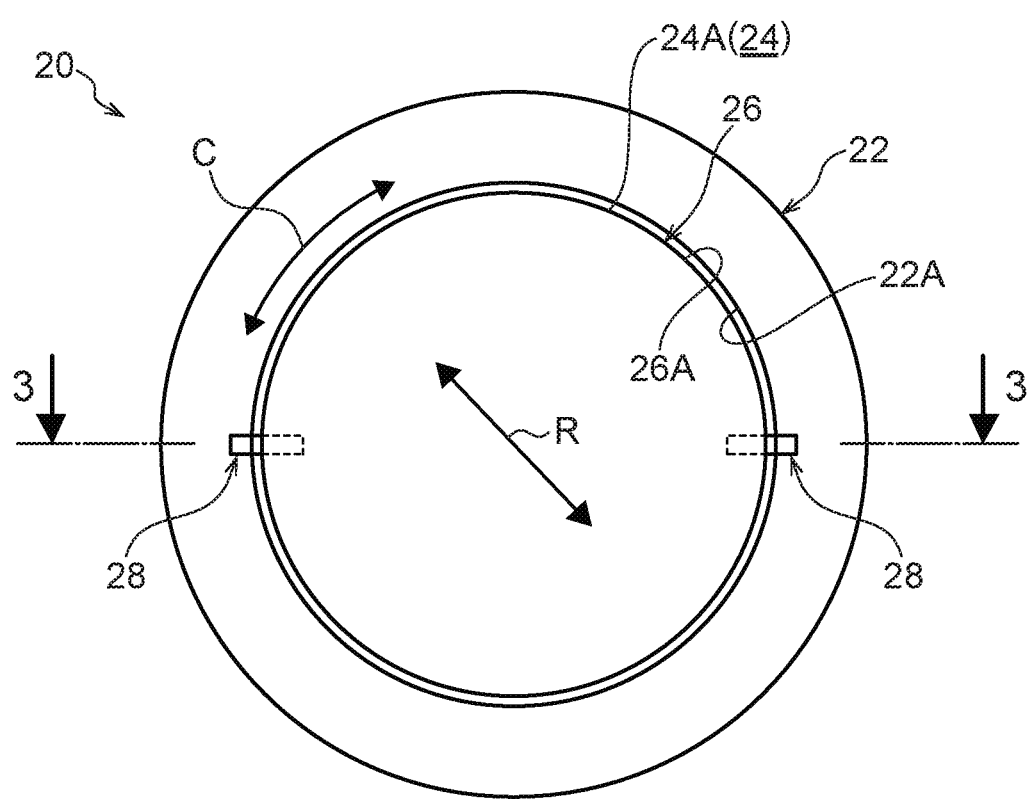
FIG. 2 is a front view showing an extrusion aperture of the extrusion apparatus shown in FIG. 1 as seen from the front.
Figure 3:
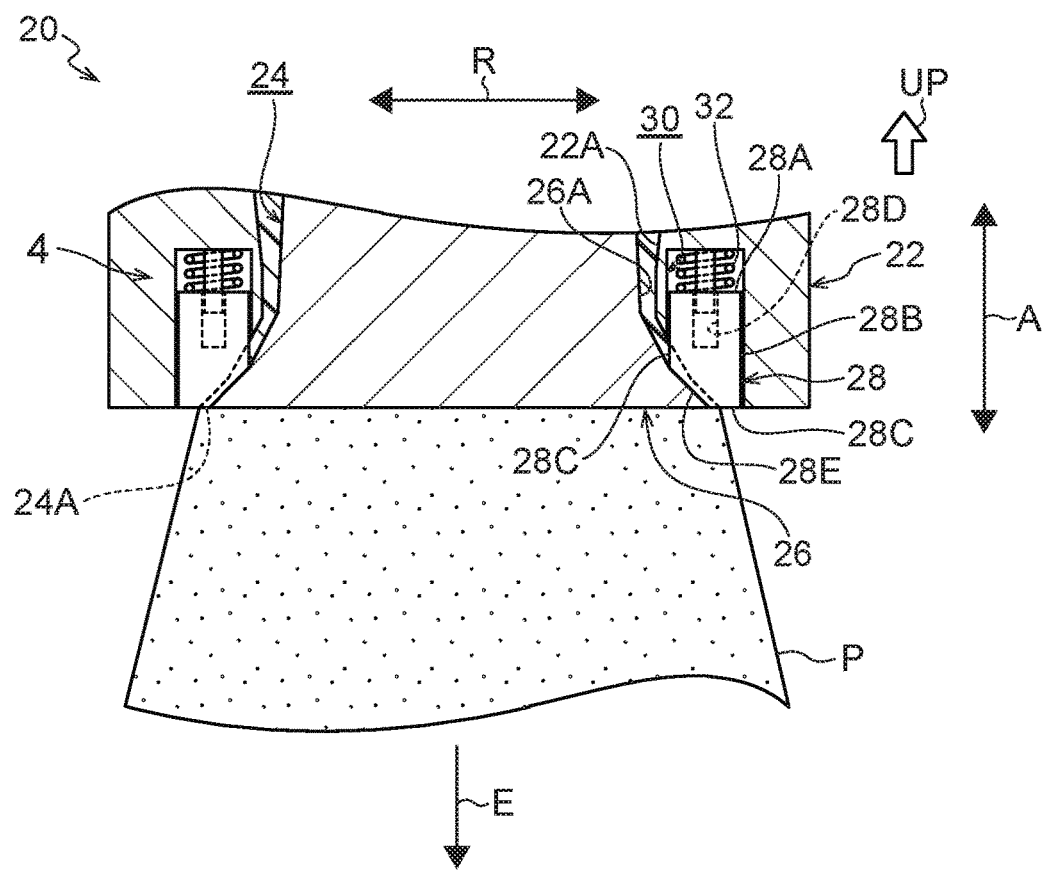
FIG. 3 is a cross-sectional view taken along a line 3-3 in FIG. 2.

As is shown in FIG. 1 through FIG. 3, the extrusion apparatus 20 is provided with a cylindrical die 22, and a core 26 that is placed inside the die 22, and that forms a flow path 24 for the molten resin P between itself and the die 22. Note that the arrow UP in the drawings refers to the upward direction of the extrusion apparatus 20.

The die 22 is created by forming a metal material into a circular cylinder shape, and an internal surface 22A thereof that forms the flow path 24 gradually widens in diameter as it moves from an entry aperture (not shown) side of the flow path 24 towards a discharge aperture 24A side thereof. Note that the die 22 of the present embodiment is an example of the die of the present disclosure. Moreover, in the drawings, an axial direction of the die 22 (hereinafter, this will be referred to where appropriate as the 'die axial direction') is shown by an arrow A, a radial direction of the die 22 (hereinafter, this will be referred to where appropriate as the 'die radial direction') is shown by an arrow R, and a circumferential direction of the die 22 (hereinafter, this will be referred to where appropriate as the 'die circumferential direction') is shown by an arrow C.

The core 26 is created by forming a metal material into a circular column shape, and is placed inside the die 22 so as to be coaxial with the die 22. The core 26 is able to move in the die axial direction relatively to the die 22. Note that, in the present embodiment, a structure is employed in which the die 22 is fixed, and the core 26 moves inside this die 22.

Moreover, an external surface 26A of the core 26 that forms the flow path 24 gradually widens in diameter as it moves from the aforementioned entry aperture side of the flow path 24 towards the discharge aperture 24A side. Note that the core 26 of the present embodiment is an example of the core of the present disclosure.

The flow path 24 is formed by the internal surface 22A of the die 22 and the external surface 26A of the core 26. On this flow path 24, molten resin P that was kneaded in a step performed on the upstream side of the extrusion step is supplied via the aforementioned entry aperture, and is extruded via the discharge aperture 24A. Note that, in the present embodiment, the discharge aperture 24A faces downwards. Because of this, the molten resin P is extruded in a downward direction from the extrusion apparatus 20. Note also that, in the drawings, the direction of extrusion of the molten resin is shown by the arrow E.

As is shown in FIG. 2, the discharge aperture 24A of the flow path 24 is formed in a substantially toroidal shape when viewed from the front side thereof (i.e., from underneath). Specifically, because the discharge aperture 24A of the flow path 24 is partitioned by separators 28 (described below) into a plurality (two in the present embodiment) of portions in the die circumferential direction, it is formed in a toroidal shape that is divided into a plurality of portions in the die circumferential direction. Because of this, the molten resin P is extruded in a sheet shape from the discharge aperture 24A of the flow path 24 (see FIG. 1 and FIG. 3).

Moreover, if the core 26 is moved in the die axial direction relatively to the die 22, the aperture width (i.e., the length of the discharge aperture 24A in the die radial direction) of the discharge aperture 24A of the flow path 24 changes. Because of this, it is possible to adjust the thickness of the resin sheet extruded from the discharge aperture 24A by adjusting the aperture width of the discharge aperture 24A.

As is shown in FIG. 3 through FIG. 5, the extrusion apparatus 20 is provided part way along the flow path 24, and is provided with recessed portions 30 that are recessed in the die axial direction, and separators 28 that are inserted into the recessed portions 30 in the die axial direction, and have a portion that extends from the recessed portion 30 into the flow path 24 that is used to cut the molten resin P.

The recessed portion 30 is formed in the internal surface 22A of the die 22 that forms the flow path 24, and is recessed in the die axial direction on the opposite side from the direction in which the molten resin P is extruded (i.e., on the upper side in FIG. 3 through FIG. 5). In addition, the recessed portion 30 is formed adjacent to the discharge aperture 24A of the flow path 24. One end portion (i.e., the top end portion in FIG. 3 through FIG. 5) 28A in the die axial direction of the separator 28 is inserted into this recessed portion 30. In addition, the shape of the recessed portion 30 is made to match the external shape of the separator 28, so that when the separator 28 is inserted into the recessed portion 30, a side surface 28B of the separator 28 slides against a recessed wall surface 30A.

A guide pin 31 that protrudes in the die axial direction is provided on a bottom surface 30B of the recessed portion 30. This guide pin 31 is inserted into a guide hole 28D that is formed in the one end portion 28A of the separator 28. By means of this structure, the separator 28 is inserted in the die axial direction into the recessed portion 30.

A coil spring 32 is also housed inside the recessed portion 30. This coil spring 32 urges the separator 28 towards the opposite side from the direction in which it is inserted into the recessed portion 30. Specifically, the coil spring 32 is placed between the bottom surface 30B of the recessed portion 30 and the one end portion 28A of the separator 28, and is wound around the guide pin 31. The coil spring 32 urges the separator 28 downwards in the die axial direction, and presses an inclined portion 28E (described below) of the separator 28 against the external surface 26A of the core 26. Note that the coil spring 32 of the present embodiment is an example of the pressing component of the present disclosure.

As is shown in FIG. 2 and FIG. 4, the separator 28 is formed in a plate shape, and is a separate body from both the die 22 and the core 26. A corner portion of the other end portion (i.e., the bottom end portion in FIG. 3 through FIG. 5) 28C side of the separator 28 in the die axial direction is cut away so as to form the inclined portion 28E. This inclined portion 28E is the portion that is pressed against the external surface 26A of the core 26, and has the same shape as the corresponding portion of the external surface 26A (i.e., the portion that the inclined portion 28E is pressed against).

As is shown in FIG. 4 and FIG. 5, the one end portion 28A of the separator 28 is inserted into the recessed portion 30, and the portion of the separator 28 that protrudes from the recessed portion 30 into the flow path 24 (hereinafter, this will be referred to where appropriate as a 'cutting portion 29') cuts the molten resin P that is moving along the flow path 24 towards the discharge aperture 24A.

The separator 28 is formed such that, when the inclined portion 28E is pressed against the external surface 26A of the core 26, it partitions the discharge aperture 24A of the flow path 24 in the die circumferential direction. Note that, in the present embodiment, as is shown in FIG. 2, two separators 28 are provided equidistantly in the die circumferential direction, so that the discharge aperture 24A of the flow path 24 is partitioned into two portions in the die circumferential direction. Because of this, when the molten resin P is extruded from the discharge aperture 24A of the flow path 24, two resin sheets having the same dimensions are formed. Note that the present disclosure is not limited to the above-described structure. It is also possible to employ a structure in which only one separator 28 is provided in the die circumferential direction, or a structure in which three or more separators 28 are provided in the die circumferential direction. If a plurality of separators 28 are provided in the die circumferential direction, then it is also possible to employ a structure in which the gaps between the placement of each separator 28 in the die circumferential direction are mutually varied.

Moreover, as is shown in FIG. 4 and FIG. 5, the insertion position of the separator 28 in the die axial direction changes in conjunction with the movement of the core 26 in relation to the die 22. Specifically, as is shown in FIG. 5, because the separator 28 is urged by the coil spring 32 such that the inclined portion 28E is pressed against the external surface 26A of the core 26, if the core 26 is moved upwards relative to the die 22, then the separator 28 moves upwards together with the core 26. As a consequence, the depth of the insertion position of the separator 28 in the recessed portion 30 in the die axial direction becomes deeper (in other words, the separator 28 is inserted all the way into the recessed portion 30). Moreover, as is shown in FIG. 4, if the core 26 is moved downwards, the separator 28 is also moved downwards together with the core 26 by its own weight and by the urging force from the coil spring 32 while being pressed against the external surface 26A of the core 26. As a result, the depth of the insertion position of the separator 28 in the recessed portion 30 in the die axial direction becomes shallower.

Note that the molten resin that is used in the extrusion apparatus 20 of the present embodiment is a multilayer molten resin. Specifically, a multilayer molten resin is formed so as to include a resin layer and a barrier layer that has a lower degree of fuel permeability (i.e., through which it is more difficult for fuel to permeate) than the resin layer. As an example, high-density polyethylene (HDPE) can be used for the resin layer, while ethylene vinyl alcohol (EVOH), as an example, can be used for the barrier layer. Note that the present disclosure is not limited to the above-described structure and the molten resin may also, for example, be a single resin layer.

Next, the operational effects of the extrusion apparatus 20 of the present embodiment will be described.

In the extrusion apparatus 20, because the molten resin P that is moving along the flow path 24 towards the discharge aperture 24A is cut by the cutting portion 29 of the separator 28 that is protruding from the recessed portion 30 into the flow path 24, sheet-shaped resin is extruded from the discharge aperture 24A of the flow path 24.

In the extrusion apparatus 20, the separator 28 is inserted into the recessed portion 30 in the die axial direction, and the insertion position of the separator 28 in the recessed portion 30 in the die axial direction changes in conjunction with the movement of the core 26 relative to the die 22. Namely, even if the core 26 moves relatively to the die 22, only the insertion position of the separator 28 in the recessed portion 30 in the die axial direction changes, and the inclined portion 28E of the separated 28 remains pressed against the same position on the external surface 26A of the core 26 and does not slide over the external surface 26A. Because of this, in the extrusion apparatus 20, compared, for example, with a structure in which the separator 28 slides over the external surface 26A of the core 26, it is difficult for a gap to be created between the inclined portion 28E of the separator 28 and the external surface 26A of the core 26, and resin leakages can be suppressed. By employing this structure, in the extrusion apparatus 20, it is possible to suppress cutting defects when the molten resin P is cut by the separator 28, and it becomes easier to obtain a resin sheet in a desired shape.

Furthermore, in the extrusion apparatus 20, because the recessed portion 30 is recessed on the opposite side from the direction in which the molten resin P is extruded, then compared, for example, with a structure in which the recessed portion 30 is recessed on the same side as the side on which the molten resin P is extruded, it is possible to effectively prevent the molten resin P that is moving along the flow path 24 towards the exist aperture 24A from penetrating into the gap between the recessed portion 30 and the separator 28.

Furthermore, in the extrusion apparatus 20, the inclined portion 28E of the separator 28 is pressed by the coil spring 32 against the external surface 26A of the core 26. Because of this, even if the core 26 moves relatively to the die 22, it is even more difficult for a gap to be created between the inclined portion 28E of the separator 28 and the external surface 26A of the core 26, and resin leakages can be effectively suppressed.

Moreover, in the extrusion apparatus 20, if the core 26 is moved upwards relative to the die 22, then because the insertion position of the separator 28 inside the recessed portion 30 simply becomes deeper, and the separator 28 does not obstruct the relative movement between the die 22 and the core 26, the gap between the internal surface 22A of the die 22 and the external surface 26A of the core 26 (i.e., the width of the flow path 24) can be made even narrower. As a consequence, an extremely thin resin sheet can be formed.

In the present embodiment, a structure is employed in which the recessed portion 30 is provided in the internal surface 22A of the die 22, and the one end portion 28A of the separator 28 is inserted into this recessed portion 30, however, the present disclosure is not limited to this structure. For example, it is also possible to employ a structure in which the recessed portion 30 is provided in the external surface 26A of the core 26, and the one end portion 28A of the separator 28 is inserted into this recessed portion 30. In this case, by making the shape of the inclined portion 28E of the separator 28 the same as the shape of the portion of the internal surface 22A of the die 22 that is pressed against (the abutting portion), it is possible to more effectively prevent a gap from being created between the one end portion 28A of the separator 28 and the internal surface 22A of the die 22.

Moreover, in the present embodiment, a structure is employed in which the internal surface 22A of the die 22 and the external surface 26A of the core 26 both gradually widen in diameter as they move from the entry aperture side of the flow path 24 towards the discharge aperture 24A thereof, however, the present disclosure is not limited to this structure. For example, it is also possible to employ a structure in which the internal surface 22A of the die 22 and the external surface 26A of the core 26 both gradually narrow in diameter as they move from the entry aperture side of the flow path 24 towards the discharge aperture 24A thereof. In this case as well, as is described above, it is possible to employ a structure in which the recessed portion 30 is provided in the internal surface 22A of the die 22, and the separator 28 is inserted into this recessed portion 30, or a structure in which the recessed portion 30 is provided in the external surface 26A of the core 26, and the separator 28 is inserted into this recessed portion 30.

Second Embodiment

Next, an extrusion apparatus 60 according to a second embodiment of the present disclosure will be described. Note that component elements that are the same as in the first embodiment are given the same descriptive symbols and any description thereof is omitted.

As is shown in FIG. 7 and FIG. 8, the extrusion apparatus 60 of the present embodiment has the same structure as the extrusion apparatus 20 of the first embodiment except for the structure of a separator 62 and a recessed portion 64.

The recessed portion 64 is formed in the internal surface 22A of the die 22 that forms the flow path 24, and is recessed in the axial direction on the opposite side (i.e., upwards in FIG. 7 and FIG. 8) from the direction in which the molten resin P is extruded. Moreover, the recessed portion 64 is formed adjacent to the discharge aperture 24A of the flow path 24. A distal end portion (i.e., a top end portion in FIG. 7 and FIG. 8) 62A of the separator 62 is inserted into this recessed portion 64. The shape of the recessed portion 64 is also made to match the external shape of the separator 62, so that when the separator 62 is inserted into the recessed portion 64, a side surface 62B of the separator 62 slides against a recessed wall surface 64A.

The separator 62 is formed in a plate shape, and is provided integrally with the core 26. Specifically, the separator 62 protrudes upwards (i.e., on the opposite side from the extrusion direction) in the die axial direction from the external surface 26A of the core 26. In other words, the separator 62 protrudes in the die axial direction from the external surface 26A of the core 26 towards the die 22. The distal end portion 62A of this separator 62 is inserted into the recessed portion 64, and the portion of the separator 62 that protrudes from the recessed portion 64 into the flow path 24 (hereinafter, this will be referred to where appropriate as a 'cutting portion 63') cuts the molten resin P that is moving along the flow path 24 towards the discharge aperture 24A.

Moreover, the insertion position of the separator 62 in the die axial direction changes in conjunction with the relative movement of the core 26 in relation to the die 22. Specifically, as is shown in FIG. 7 and FIG. 8, if the core 26 is moved upwards relative to the die 22, then the separator 62, which is formed integrally with the core 26, moves upwards together with the core 26. As a consequence, the depth of the insertion position of the separator 62 in the recessed portion 64 in the die axial direction becomes deeper. If the core 26 is moved downwards relatively to the die 22, the separator 62 is also moved downwards together with the core 26, so that the depth of the insertion position of the separator 62 in the recessed portion 64 in the die axial direction becomes shallower.

Next, the operational effects of the extrusion apparatus 60 of the present embodiment will be described. Note that any description of operational effects that are obtained by means of structure that is the same as in the extrusion apparatus 20 of the first embodiment is omitted.

In the extrusion apparatus 60, the separator 62 that protrudes upwards in the die axial direction from the external surface 26A of the core 26 is inserted in the die axial direction into the recessed portion 64 that is provided in the internal surface 22A of the die 22. Accordingly, even if the core 26 moves relatively to the die 22, because a structure is employed in which the insertion position of the separator 62 in the recessed portion 64 in the axial direction changes, no portion of the separator 62 is able to slide over the internal surface 22A of the die 22. Because of this, in the extrusion apparatus 60, a gap is prevented from being created between the separator 62 and the internal surface 22A of the die 22.

Moreover, in the extrusion apparatus 60, because the separator 62 is provided integrally with the core 26, manufacturing costs for the apparatus can be reduced. Furthermore, because the separator 62 is provided integrally with the core 26, there are no other movable components between the die 22 and the core 26, so that maintenance is simple.

In the present embodiment, a structure is employed in which the separator 62 that protrudes upwards in the die axial direction is provided integrally with the external surface 26A of the core 26, and the recessed portion that is recessed upwardly in the die axial direction is provided in the internal surface 22A of the die 22, however, the present disclosure is not limited to this structure. For example, it is also possible to employ a structure in which a separator 62 that protrudes downwards in the die axial direction is provided integrally with the internal surface 22A of the die 22, and a recessed portion that is recessed downwardly in the die axial direction is provided in the external surface 26A of the core 26.

Moreover, in the present embodiment, a structure is employed in which the separator 62 is provided integrally with the core 26, and the recessed portion 64 is provided in the die 22, however, the present disclosure is not limited to this structure. For example, as is the case with an extrusion apparatus 70, which is a variant example of the extrusion apparatus 60 and is shown in FIG. 9 and FIG. 10, it is also possible to employ a structure in which a separator 72 having the same structure as the separator 62 is provided in the die 22, and a recessed portion 74 having the same structure as the recessed portion 64 is provided in the core 26. In this extrusion apparatus 70, the same type of effects as the effects obtained from the extrusion apparatus 60 can be obtained. Note that, in FIG. 9 and FIG. 10, the cutting portion of the separator 72 is indicated by the symbol 73. Moreover, in the extrusion apparatus 70, the internal surface 22A of the die 22 and the external surface 26A of the core 26 both gradually widen in diameter as they move from the entry aperture side of the flow path 24 towards the discharge aperture 24A thereof. Moreover, the structure of the extrusion apparatus 70 can also be one in which, for example, the separator 72, which protrudes downwards in the die axial direction, is provided integrally with the external surface 26A of the core 26, and the recessed portion 74, which is recessed downwards in the die axial direction, is provided in the internal surface 22A of the die 22.

Third Embodiment

Next, an extrusion apparatus 80 according to a third embodiment of the present disclosure will be described. Note that component elements that are the same as in the first embodiment are given the same descriptive symbols and any description thereof is omitted.

Figure 11:
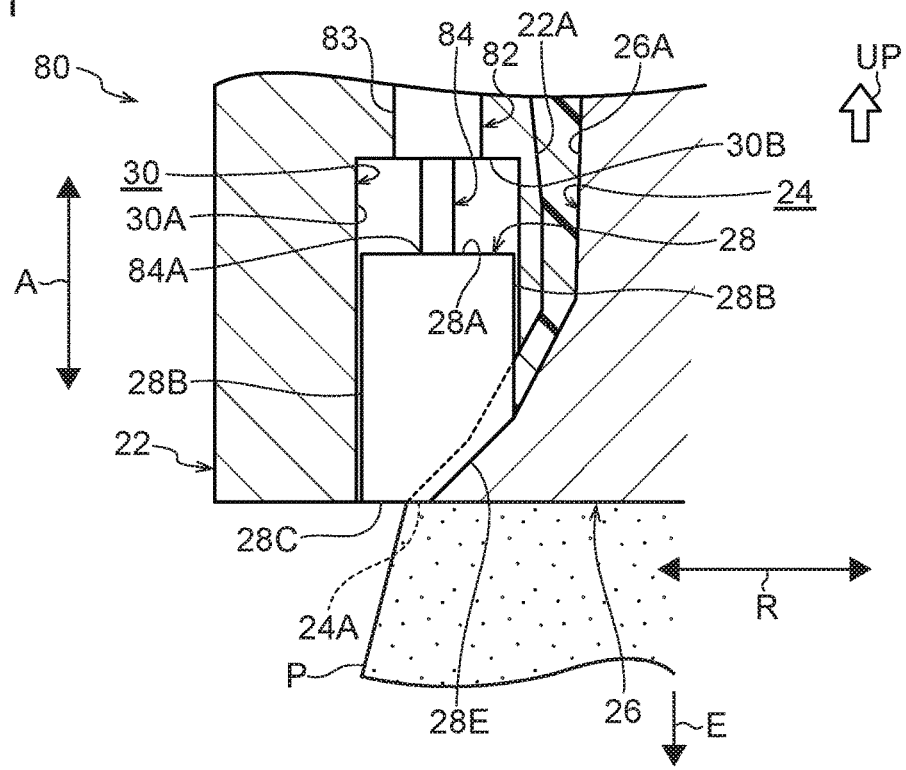
FIG. 11 is an enlarged cross-sectional view (i.e., an enlarged cross-sectional view corresponding to FIG. 4) showing principal portions of an extrusion apparatus according to a third embodiment of the present disclosure.
Figure 12:
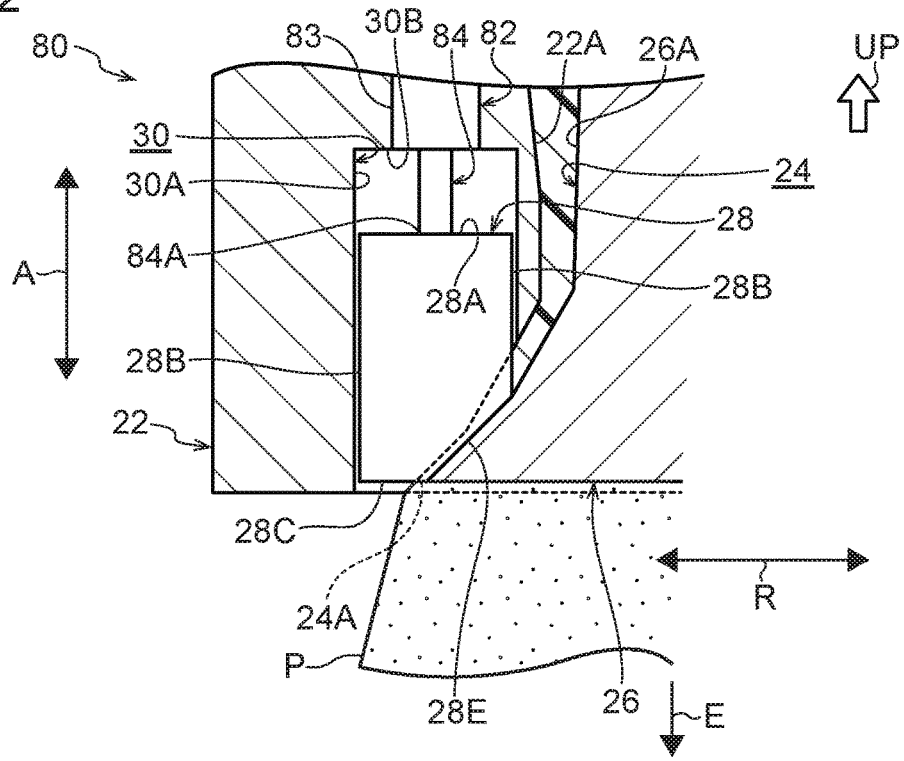
FIG. 12 is an enlarged cross-sectional view showing a state in which a core has been moved upwards from a position shown in FIG. 11.
Figure 13:
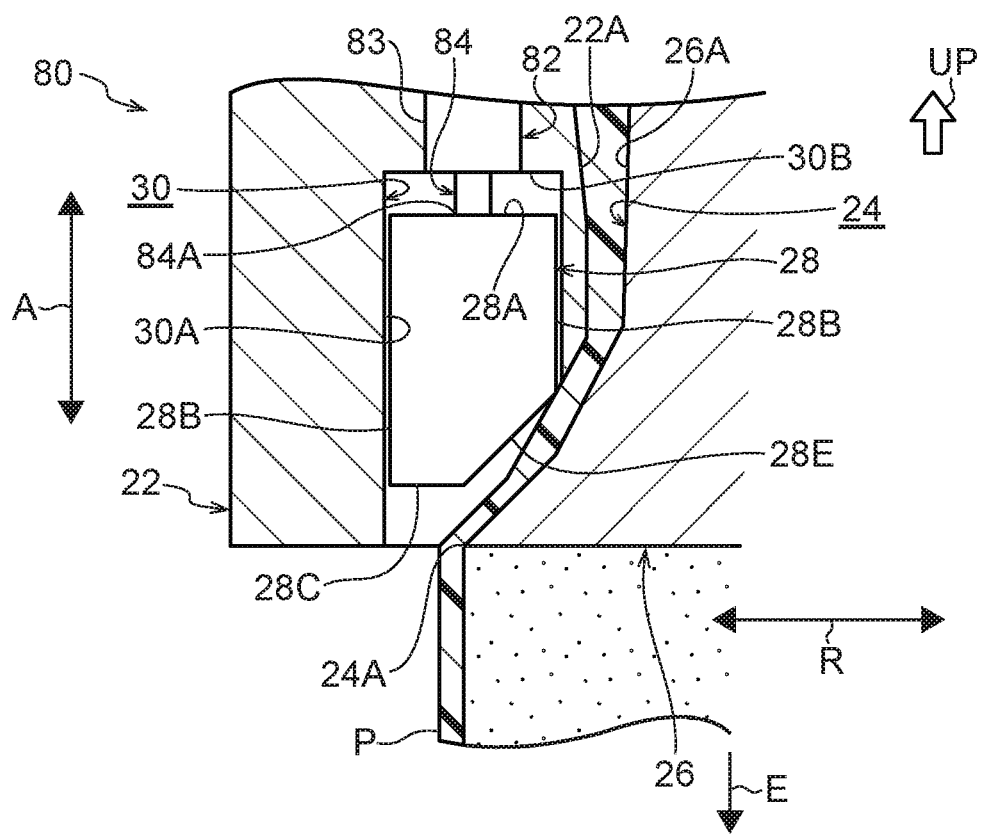
FIG. 13 is an enlarged cross-sectional view showing a state in which a separator has been housed in a recessed portion and moved away from a core.

As is shown in FIG. 11 through FIG. 13, the extrusion apparatus 80 of the present embodiment has the same structure as the extrusion apparatus 20 of the first embodiment other than that an air cylinder 82 is used as an example of the pressing component of the present disclosure.

A main body portion 83 of the air cylinder 82 is embedded in the bottom surface 30B of the recessed portion 30, and a distal end portion 84A of a piston rod 84 that protrudes out from the main body portion 83 is placed inside the recessed portion 30. This air cylinder 82 is constructed such that the piston rod 84 can be pushed out in the die axial direction from inside the main body portion 83 and can also be pulled back therein. In the present embodiment, the air cylinder 82 is used as an example of the pressing component of the present disclosure, however, the present disclosure is not limited to this structure, and it is also possible to use a hydraulic cylinder.

The distal end portion 84A of the piston rod 84 is joined to the one end portion 28A of the separator 28. Note that the separator 28 of the present embodiment has a structure in which the guide hole 28D is not formed. Moreover, as is shown in FIG. 11, the piston rod 84 is pushed out from the main body portion 83, and pushes the inclined portion 28E of the separator 28 against the external surface 26A of the core 26. Note that the pushing force of the piston rod 84 that is generated by the air cylinder 82 is smaller than the motive force of the core 26, and if the core 26 moves upwards relative to the die 22, then the piston rod 84 is pushed back inside the main body portion 83 by the separator 28 which moves together with the core 26 (see FIG. 12).

Moreover, as is shown in FIG. 13, the air cylinder 82 is constructed such that, as a result of the piston rod 84 being pulled back, the entire separator 28 is housed inside the recessed portion 30. In other words, the air cylinder 82 is able to retract the entire separator 28 into the inside of the recessed portion 30.

Next, the operational effects of the extrusion apparatus 80 of the present embodiment will be described. Note that any description of operational effects that are obtained by means of structure that is the same as in the extrusion apparatus 20 of the first embodiment is omitted.

In the extrusion apparatus 80, as is shown in FIG. 13, by retracting the piston rod 84 of the air cylinder 82 back inside the main body portion 83, and by moving the inclined portion 28E of the separator 28 away from the external surface 26A of the core 26 and housing it inside the recessed portion 30, the cutting portion 29 is also housed inside the recessed portion 30. Because of this, the molten resin P that is moving long the flow path 24 towards the discharge aperture 24A does not get cut. Namely, in the extrusion apparatus 80, because one separator 28 from among the two separators 28 is housed inside the recessed portion 30, a single resin sheet can be extruded from the discharge aperture 24A of the flow path 24. Moreover, in the extrusion apparatus 80, by housing both of the separators 28 respectively inside the recessed portions 30, a cylindrical resin sheet can be extruded from the discharge aperture 24A of the flow path 24.

In the extrusion apparatus 80 of the present embodiment, in the same way as in the first embodiment, a structure is employed in which two separators 28 are provided, however, the present disclosure is not limited to this structure, and it is also possible to employ a structure in which three or more separators 28 are provided. In this case, by controlling the outward pushing of the piston rod 84 of the air cylinder 82 that is provided for each individual separator 28, it is easy to alter the dimensions of the resin sheets that are extruded from the discharge aperture 24A of the flow path 24.

In the present embodiment, a structure is employed in which the main body portion 83 of the air cylinder 82 is embedded in the bottom surface 30B of the recessed portion 30 of the die 22, and the distal end portion 84A of the piston rod 84 is placed inside the recessed portion 30, however, the present disclosure is not limited to this structure. For example, it is also possible to provide a structure in which the recessed portion 30 is provided in the external surface 26A of the core 26, the main body portion 83 of the air cylinder 82 is embedded in the bottom surface 30B of this recessed portion 30, and the distal end portion 84A of the piston rod 84 is placed inside the recessed portion 30.

Embodiments of the present disclosure have been described and illustrated above, however, the present disclosure is not limited to these embodiments. It is to be understood that various modifications and the like may be made insofar as they do not depart from the spirit or scope of the present disclosure.

All references, patent applications and technical specifications cited in the present specification are incorporated by reference into the present specification to the same extent as if the individual references, patent applications and technical specifications were specifically and individually recited as being incorporated by reference.

What is claimed is:

1. An extrusion apparatus, comprising:
   a cylindrical die;
   a core that is placed inside the die, that is able to move relatively to the die in an axial direction of the die, and that forms a flow path for molten resin between the core and the die;
   a recessed portion that is provided partway along the flow path, and that is recessed in the axial direction; and
   a separator that is inserted into the recessed portion in the axial direction, an insertion position of the separator in the axial direction changing in conjunction with the movement of the core relative to the die, and that cuts the molten resin into a sheet by a portion thereof that extends from the recessed portion into the flow path, wherein:
   the recessed portion is provided at one of the die or the core, and internally houses a pressing component,
   the separator is provided independently of the die and the core, and
   the pressing component urges the separator towards an opposite side from the direction in which the separator is inserted into the recessed portion so as to press the separator against the other one of the die or the core.

2. The extrusion apparatus according to claim 1, wherein the recessed portion is recessed toward an opposite side from a direction in which the molten resin is extruded.

3. The extrusion apparatus according to claim 1 wherein:
   a plurality of the recessed portions and a plurality of the separators are provided at one of the die or the core, and
   the pressing component is able to retract the entire separator into the inside of the recessed portion.

4. An extrusion apparatus, comprising:
   a cylindrical die;
   a core that is placed inside the die, that is able to move relatively to the die in an axial direction of the die, and that forms a flow path for molten resin between the core and the die;
   a recessed portion that is provided partway along the flow path, and that is recessed in the axial direction; and
   a separator that is inserted into the recessed portion in the axial direction, an insertion position of the separator in the axial direction changing in conjunction with the movement of the core relative to the die, and that cuts the molten resin by a portion thereof that extends from the recessed portion into the flow path, wherein:
   the recessed portion is provided at one of the die or the core, and internally houses a pressing component,
   the separator is provided independently of the die and the core, and
   the pressing component urges the separator towards an opposite side from the direction in which the separator is inserted into the recessed portion so as to press the separator against the other one of the die or the core, and
   wherein:
   a plurality of the recessed portions and a plurality of the separators are provided at one of the die or the core, and
   the pressing component is able to retract the entire separator into the inside of the recessed portion.

5. The extrusion apparatus according to claim 4, wherein the plurality of recessed portions are recessed toward an opposite side from a direction in which the molten resin is extruded.

* * * * *